(12) United States Patent  
Kerstetter

(10) Patent No.: US 6,985,370 B2  
(45) Date of Patent: Jan. 10, 2006

(54) AC POWER LINE FILTER

(76) Inventor: David Kerstetter, P.O. Box 551, Agoura Hills, CA (US) 91376

( * ) Notice: Subject to any disclaimer, the term of this patent is extended or adjusted under 35 U.S.C. 154(b) by 124 days.

(21) Appl. No.: 10/667,962

(22) Filed: Sep. 22, 2003

(65) Prior Publication Data

US 2004/0090803 A1 May 13, 2004

Related U.S. Application Data

(63) Continuation-in-part of application No. 10/155,161, filed on May 24, 2002, now abandoned.

(51) Int. Cl.  
*H02M 1/12* (2006.01)  
*H02M 1/14* (2006.01)

(52) U.S. Cl. .......................... 363/39; 363/44; 307/105
(58) Field of Classification Search ................ 363/44, 363/39; 307/105  
See application file for complete search history.

(56) References Cited

U.S. PATENT DOCUMENTS

| | | | |
|---|---|---|---|
| 518,739 A | 4/1894 | Kelly | |
| 1,255,387 A | 2/1918 | Chubb | |
| 2,743,412 A | 4/1956 | McLean | |
| 3,133,259 A | * 5/1964 | Dine | 333/167 |
| 3,237,089 A | 2/1966 | Dubin | |
| 3,579,154 A | * 5/1971 | Deen | 333/176 |
| 3,906,157 A | 9/1975 | Boner et al. | |
| 4,194,128 A | 3/1980 | Biglin | |
| 4,286,207 A | 8/1981 | Spreadbury et al. | |
| 4,328,474 A | * 5/1982 | Goodman et al. | 333/176 |
| 4,551,780 A | 11/1985 | Canay | |
| 4,672,522 A | * 6/1987 | Lesea | 363/48 |
| 4,724,333 A | * 2/1988 | Hedin | 307/105 |
| 4,760,356 A | 7/1988 | Kempster | |
| 4,939,486 A | 7/1990 | Bergdahl et al. | |
| 5,113,335 A | * 5/1992 | Smith | 363/44 |
| 5,148,360 A | 9/1992 | Nguyen | |
| 5,224,029 A | 6/1993 | Newman, Jr. | |
| 5,251,120 A | * 10/1993 | Smith | 363/44 |
| 5,260,862 A | 11/1993 | Marsh | |
| 5,323,304 A | * 6/1994 | Woodworth | 363/47 |
| 5,343,381 A | 8/1994 | Bolduc et al. | |
| 5,406,226 A | 4/1995 | Cioffi et al. | |
| 5,570,006 A | * 10/1996 | Woodworth | 323/208 |
| 5,619,080 A | * 4/1997 | Pennington et al. | 307/105 |
| 5,625,894 A | * 4/1997 | Jou | 455/78 |
| 5,627,743 A | 5/1997 | Sadarnac et al. | |
| 5,768,111 A | 6/1998 | Zaitsu | |
| 5,864,185 A | * 1/1999 | Neugebauer et al. | 307/105 |
| 5,920,468 A | 7/1999 | Brisson et al. | |
| 6,198,643 B1 | 3/2001 | Gray | |
| 6,600,294 B1 | * 7/2003 | DiPiazza | 323/212 |

* cited by examiner

Primary Examiner—Bao Q. Vu

(57) ABSTRACT

A parallel resonant circuit for removing noise and harmonic frequencies from the AC power source is connected directly in parallel to a power source with no intervening electrical components. The parallel resonant circuit is comprised of at least one inductor for drawing an inductive current that is substantially equal to but one hundred and eight degrees out of phase with at least one capacitor that draws a capacitive current. The capacitors and the inductors of the parallel resonant circuit are connected in parallel and may be tuned to the fundamental frequency of the power line.

12 Claims, 7 Drawing Sheets

AC POWER LINE FILTER

CROSS-REFERENCE TO RELATED APPLICATIONS

The present application is a Continuation-In-Part (CIP) of U.S. patent application Ser. No. 10/155,161, filed May 24, 2002, now abandoned, the entire disclosure of which is incorporated herein by reference.

BACKGROUND OF THE INVENTION

1. Field of the Invention

The present invention generally relates to filtering circuits comprised of a parallel resonant circuit, and more particularly, to parallel resonant circuits that directly connect to AC power sources without any intervening elements, reducing all frequency distortions in alternative currents, including harmonic distortion.

2. Description of Related Art

In general, as illustrated in the prior art FIG. 1A, parallel resonant circuits 6 comprised of a capacitor 12 connected in parallel to an inductor 10 are always connected to a power source 2 through one or more electrical components 8. Each of the components 8A and 8B may for example comprise of one or more inductors to isolate a load 4 from a source 2, one or more resistors to dampen oscillations or dissipate power, or some other elements to perform other functions. The components 8 do not represent inherent or intrinsic characteristics of any electrical component, but represent extrinsic, additional components such as actual resistors or inductors. The circuit topography comprised of the parallel resonant circuits 6 coupled with at least one or more other components 8 is purported to reduce harmonic distortions in an alternative current waveform, in addition to the functions described above, with the additional functions depending on the type(s) of element(s) 8 always connected to the parallel resonant circuit 6.

When AC current flows through the inductance 10 a back electromotive force (emf) or voltage develops across it, opposing any change in the initial AC current. This opposition or impedance to change in current flow is measured in terms of inductive reactance. The inductive reactance is determined by the formula:

$$Z_L = (2\pi f L) \quad (1)$$

Where
f=Operating Frequency
L=Inductance
$Z_L$=Reactive Impedance of the Inductor.

When AC voltage develops across the capacitor 12, an opposing change in the initial voltage occurs, this opposition or impedance to a change in voltage is measured in terms of capacitive reactance. The capacitive reactance is determined by the formula:

$$Z_c = 1/(2\pi f C) \quad (2)$$

Where
f=Operating Frequency
C=Capacitance
$Z_c$=Reactive Impedance of the Capacitor.

Resonance for circuit 6 occurs when the reactance $Z_L$ of the inductor 10 balances the reactance $Z_C$ of the capacitor 12 at some given frequency f. The resonance frequency is therefore determined by setting the two reactance equal to one another and solving for the frequency, f.

$$(2\pi f L) = 1/(2\pi f C) \quad (3)$$

This leads to:

$$f_{RE} = 1/2\pi\sqrt{LC} \quad (4)$$

Where
$f_{RE}$=Resonant Frequency.

In general, the parallel resonant circuits present very high impedance to those electrical signals that also operate at the same resonant frequency, $f_{RE}$. At resonance, input signals with frequencies becoming far removed from the resonance frequency $f_{RE}$ see ever-decreasing impedance presented by the parallel resonant circuit. For example, if parallel resonant circuit 6 illustrated in FIG. 1A is tuned to resonate at the fundamental frequency of the power source 2, where $f_{RE} = f_{FUND}$, the input current signals from power source 2 that operate at frequencies equal to $f_{FUND}$ will be rejected by circuit 6 and will pass onto the load 4. To these current signals, the parallel resonant circuit 6 is almost invisible because it behaves almost like an "open circuit" at $f_{RE} = f_{FUND}$. As the input current signals depart from the resonant frequency, up or down, the parallel circuit 6 presents a lessening impedance and progressively allows other signals (those not operating at $f_{RE}$) to leak to ground. For signals at frequencies far removed from resonance, the parallel resonant circuit 6 presents a short path to ground. Using these principles, parallel resonant circuits 6 may be tuned to the fundamental frequencies of the power source 2 to therefore filter out frequencies above or below the fundamental, providing low noise signals to load 4. The filtering action is mainly done by the capacitance portion of the parallel resonant circuit, with the inductance part "giving back" the capacitive current drawn by the capacitor. In general, one may look at the impedance presented by the parallel resonant circuit in terms of its capacitive impedance $Z_C$ of equation (2) above. Accordingly, for high frequencies the denominator of equation (2) having the frequency value f will increase, making the total impedance of the parallel resonant circuit smaller.

The amount of noise on signals passed on to load 4 depend mostly on how much of lessening impedance any path to ground presents for input signal with operating frequency above or below the desired operating frequency. In particular, the total impedance of any path to ground must be considered to determine the appropriate filtering effect for signals with undesirable frequencies, and not just that of the parallel resonant circuit. In the instance of FIG. 1A, the total impedance includes that presented by the parallel resonant circuit 6 and those of any component 8 coupled thereto. Therefore, the total impedance of a path to ground for signals with undesirable operating frequency will not behave as a shorted path even if the parallel resonant circuit behaves ideally and presents a "short circuit" behavior. Components 8 will still maintain and present impedance commensurate with their rated values, regardless of any frequency variations. Accordingly, the true impedance of the circuit path to ground for the combination of the parallel resonant circuit 6 and the components 8 is given by:

$$Z_{TOTAL} = Z_{PRC} + Z_8 \quad (5)$$

Where
$Z_8$=Impedance of elements 8A or 8B.
$Z_{PRC}$=Impedance of the Parallel Resonant Circuit
$Z_{TOTAL}$=Total impedance.

FIG. 1B graphically illustrates the consequence of the additional impedance $Z_8$ of component(s) 8. As shown, as the frequency f increases (moves away from the resonant frequency), the total impedance $Z_{TOTAL}$ illustrated by line 14 decreases, allowing short path for current signals with undesirable frequencies to ground, filtering these signals. However, even if the frequencies become very large where the $Z_{PRC}$ of the $Z_{TOTAL}$ becomes almost zero, $Z_{TOTAL}$ itself will than equal to $Z_8$. Hence, for frequencies much higher than those desired, equation (5) will equal:

$$Z_{TOTAL}=0+Z_8 \tag{6}$$

$Z_{TOTAL}$ can never present a short circuit path for signals with frequencies removed from the desired operating frequency due to impedance of one or both of the elements 8A and 8B. Hence, all the undesirable frequencies illustrated in region 16 of the graph will continue to be passed on to the load 4, regardless of how low of an impedance the parallel resonant circuit 6 presents to the signals that operate away from the resonant frequency.

As a specific example, U.S. Pat. Nos. 5,323,304 and 5,570,006, both to Woodworth, the entire disclosures of which are incorporated herein by reference, teach in their respective FIG. 1 the use of parallel resonant circuit 20 coupled through an inductor 21 to a power source 12. In this instance, the inductor 21 would constitute the elements 8A of the prior art FIG. 1A of the present invention. As taught in Woodworth, the series connected inductor 21 isolates the power source 12 from the load 16 such that harmonic currents that may be generated by the load 16 will minimally affect the power source 12. In addition, the inductor 21 also serves to increase the effective impedance of the power source 12 as seen by the load 16, limiting the amount of power that can be drawn by the load. This increase in effective impedance ($Z_8$ of the inductor 21) degrades the filtering effect of the parallel resonant circuit, and as illustrated in prior art FIG. 2A, distorts the output current and voltage supplied to a load.

U.S. Pat. No. 3,237,089 to Dubin et al shows a similar circuit where inductor $L_s$ is connected in series with the parallel resonant circuit LC, comprised of an inductor L connected in parallel with a capacitor C. The circuit topography illustrated is a simplified equivalent circuit of a saturable-type constant voltage transformers, where inductor $L_s$ isolates the power source $e_i$ from a load. This circuit is illustrated only for as a way to show how a constant voltage transformer functions. Therefore, the reference U.S. Pat. No. 3,237,089 is only concerned with voltage level control, and not filtering action.

Many electronic devices (loads) today draw current only at the peaks of the sinusoidal AC power supply voltage. This cause the peaks of the AC supply waveform to become flattened out because of this non-linear loading of the power grid, reducing the amount of power supply required by loads. As illustrated in the prior art FIG. 2A, this is easily detected by measuring the amount of current $I_L$ 20 drawn by load 4 of FIG. 2B, and the sinusoidal voltage $V_L$ 18 across the load 4. The current drawn by the load 4 at the peak of the sinusoidal voltage causes the voltage waveform 18 to be flattened at its sinusoidal peak. The more loads are connected to a power source, the flatter the waveform of the voltage across those loads.

Adding components 8 (FIG. 1A) exasperate the above-described situation, worsening the flattening of the voltage waveform at the load. For example, the sudden draw of current 20 by load 4 at the peak of the voltage 18 produces an opposing voltage across inductor 24 (due to the inductive reactance), lowering even further the peak of the voltage 18 available to the load 4. Addition of components 8 distorts the voltage waveform 18 across the load 4, generating noise thereat. Noise is generated because load requirements for appropriate load current and voltage are not met. Hence, even low value inductors 24 in series with the power source 2 and the parallel resonant circuit 6 cause much trouble.

As another specific example, the U.S. Pat. No. 5,343,381 to Bolduc et al, the entire disclosure of which is incorporated herein by reference, teach in their FIG. 1 the use of a resistor element 8 connected in series with a parallel resonant circuit that is comprised of a capacitor 4 connected in parallel with an inductor 6 to produce a dampening circuit 2. In this instance, the resistor 8 of Bolduc et al would constitute the elements 8B of the prior art FIG. 1A of the present invention. The dampening resistor 8 degrades correction of any possible output distortions illustrated in prior art FIG. 2A of the present invention. In addition, the LC filtering effect is also degraded due to the added impedance of resistor 8, as graphically illustrated in the prior art FIG. 1B of the present invention. In this instance, the impedance $Z_8$ illustrated in FIG. 1B equal the value of resistor 8.

As described and illustrated, parallel resonant circuits have always been connected to a power source through some other component that degrades or negates the resonant circuit's performance in terms of output signal correction and filtering of signals that operate at undesired frequencies.

BRIEF SUMMARY OF THE INVENTION

The present invention provides a simple and novel circuit topography for correcting output signal distortions and filtering signals operating at undesirable frequencies using a parallel resonant circuit that connects directly to a power source with no intervening components between the source and the parallel resonant circuit.

By removing intervening components from between the power source and the parallel resonant circuit, the impedance of those components is also removed. Accordingly, at resonance, input signals with frequencies becoming far removed from the resonance frequency will only see an ever decreasing impedance presented by the parallel resonant circuits with no other electrical components to present additional impedance that degrade or negate the performance of the parallel resonant circuit. In addition, the circuit topography of the present invention improves the restoration of output signal distortions that are generally caused and exacerbated by the addition of electrical components.

The direct connection of resonant circuit to a power source corrects voltage and current distortions in a power system operating at a system line frequency wherein the resonant circuit is directly connected in parallel with a source, with no intervening components. The resonant circuit includes at least one capacitor for drawing a capacitive current and at least one inductor for drawing an inductive current equal in amplitude and opposite in phase with the capacitive current. The at least one inductor is connected in parallel with the capacitor to form a parallel resonant circuit. The resulting parallel resonant circuit is tuned to resonate at the system line frequency such that the parallel resonant reactance of the circuit is at its peak at the system line frequency and lower at frequencies above and below the system line frequency As such, the parallel resonant circuit absorbs voltage perturbations in excess of the amplitude of the power system signal at all frequencies above or below the system line frequency and provides energy to restore notches in the amplitude of the power system signal at all frequencies above or below the system line frequency.

The present invention is also directed to a method for correcting voltage and current distortions in a power system operating at a system line frequency comprising the steps of forming a parallel resonant circuit wherein the circuit comprises at least one capacitor for drawing a capacitive current and at least one inductor for drawing an inductive current equal in amplitude and one hundred eighty degrees out of phase with the capacitive current connected in parallel with the capacitor, wherein the parallel resonant circuit is tuned to resonate at the system line frequency. The method further comprises the step of connecting the parallel resonant circuit in parallel with a power source with no intervening components between the power source and the parallel resonant circuit.

Accordingly, the addition of a device constructed according to the present invention greatly diminishes the effective power line impedance as seen by the load at frequencies above and below the system's power line frequency and thereby limits any local distortion at the load. The impedance at the output terminals of the device is very low and may source current at frequencies both above and below that of the power line. The parallel impedance of the power line and the device(s) connected to it provide impedance far less than either impedance alone. This lower source impedance offers the load a stiffer power source that does not sag or drop out during high loading conditions due to load turn-on and turn-off impulses.

These and other features, aspects, and advantages of the invention will be apparent to those skilled in the art from the following detailed description of preferred non-limiting embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention.

Referring to the drawings in which like reference numbers present corresponding parts throughout.

DETAILED DESCRIPTION OF THE INVENTION

Figure 3A:
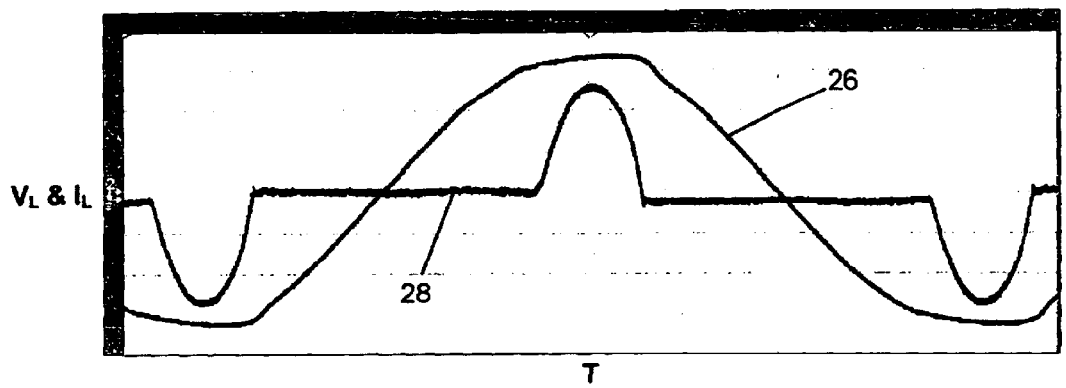
FIG. 3A is an exemplary graphical illustration of a voltage across and the current through a load in accordance with the present invention.
Figure 3B:
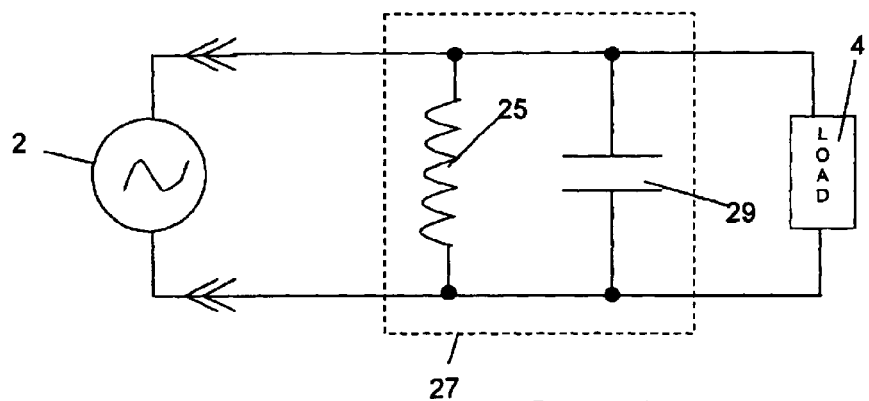
FIG. 3B schematically illustrates an exemplary power system using a parallel resonant circuit directly connected to a power source in accordance with the present invention.

FIG. 3A is an exemplary graphical illustration of a voltage 26 across a load 4 and a current 28 through it for a circuit shown in FIG. 3B in accordance with the present invention. The illustrated circuit that is schematically shown in FIG. 3B is a power system comprised of a power source 2 coupled directly to a parallel resonant circuit 27 with no intervening components. The parallel resonant circuit 27 is comprised of an inductor 25 connected in parallel to a capacitor 29, with the resulting circuit 27 connected in parallel to a load 4. The power source 2 provides a sinusoidal power signal to the load 4.

The reactive impedance of the inductor 25 and the capacitor 29 of parallel resonant circuit 27 are set substantially equal in value, but opposite in sign. Accordingly, they are tuned to resonate at a frequency. Although the parallel resonant circuit 27 may be tuned to operate at any resonant frequency value (depending on the size of the components), the preferred embodiment is to tune the circuit 27 to operate at a resonant frequency that matches the operating fundamental frequency of the power source 2 to filter out frequencies above or below the fundamental, providing low noise signals to load 4.

For the schematic circuit illustrated in FIG. 3B, the total impedance of the path to ground for input signals operating far removed from the fundamental includes only that presented by the parallel resonant circuit 27. Therefore, the total impedance of a path to ground for signals with undesirable operating frequency will behave as a shorted path when the parallel resonant circuit 27 behaves ideally and presents a "short circuit" behavior. Unlike the prior art, the circuit topography of the present invention has no components that will continue to maintain and present impedance commensurate with their rated values, even when a short path is presented by the parallel resonant circuit. Accordingly, the true impedance of the circuit path to ground for FIG. 3B is given by:

$$Z_{TOTAL} = Z_{PRC} \quad (7)$$

Where
$Z_{PRC}$=Impedance of the Parallel Resonant Circuit
$Z_{TOTAL}$=Total impedance.

Figure 3C:
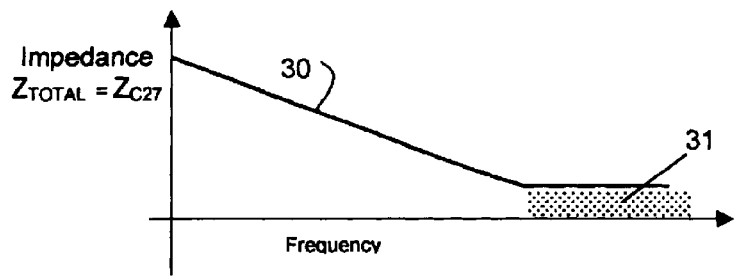
FIG. 3C schematically illustrates an exemplary graphical illustration of impedance vs. frequency for the circuit of FIG. 3B in accordance with the present invention.

FIG. 3C graphically illustrates the impedance versus frequency for the circuit topography schematically illustrated in FIG. 3B, with no intervening components coupled between the parallel resonant circuit 27 and the power source 2. As shown, as the frequency increases (moves away from the resonant frequency), the total impedance $Z_{TOTAL}$ (for the path to ground for these signals) illustrated by line 30 decreases to thereby allow a short path to ground for current signals with undesirable frequencies, filtering out these signals. For large frequencies, the $Z_{TOTAL}$ will approximately equal zero, as is illustrated in the region 31 of the graph. The main reason for this region 31 is due to the intrinsic or inherent impedance values of the parallel resonant circuit 27. No matter how low of an impedance presented by this circuit, the circuit is still comprised of electrical components (inductor 25 and capacitor 29) that like all others have an inherent or intrinsic impedance values. Hence, for frequencies much higher than those desired the impedance presented by the parallel resonant circuit would be approximately zero, with $Z_{TOTAL} \approx 0$. Accordingly, most of the undesirable frequencies are filtered with the exception of those with very high frequencies illustrated in region 31.

Figure 1A:
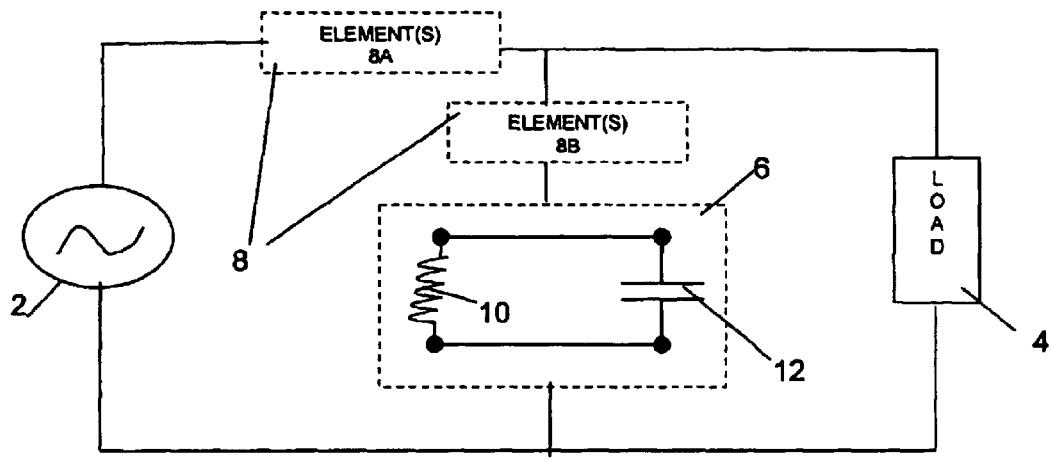
FIG. 1A is a prior art exemplary illustration of circuit topography used with a parallel resonant circuit.
Figure 1B:
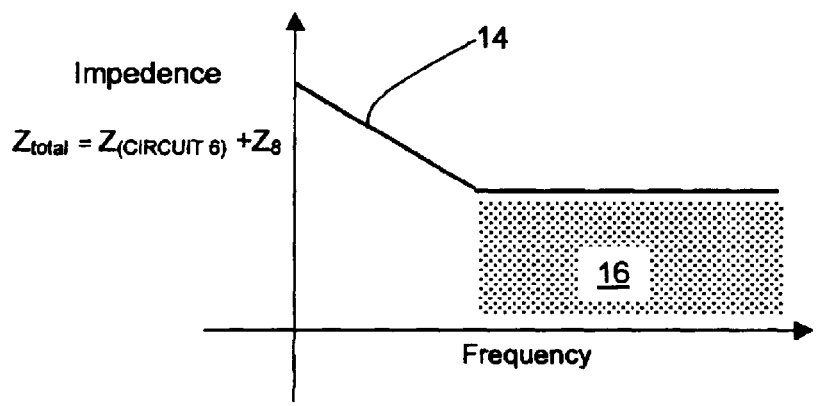
FIG. 1B is a prior art exemplary graphical illustration of frequencies not filtered out by the circuit of FIG. 1A.
Figure 2A:
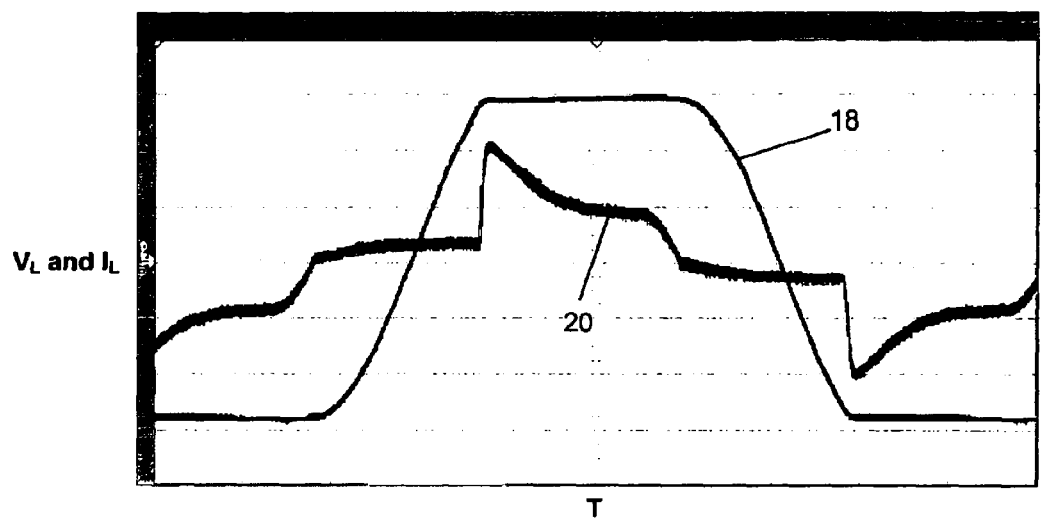
FIG. 2A is a prior art exemplary graphical illustration of a voltage across and the current through a load.
Figure 2B:
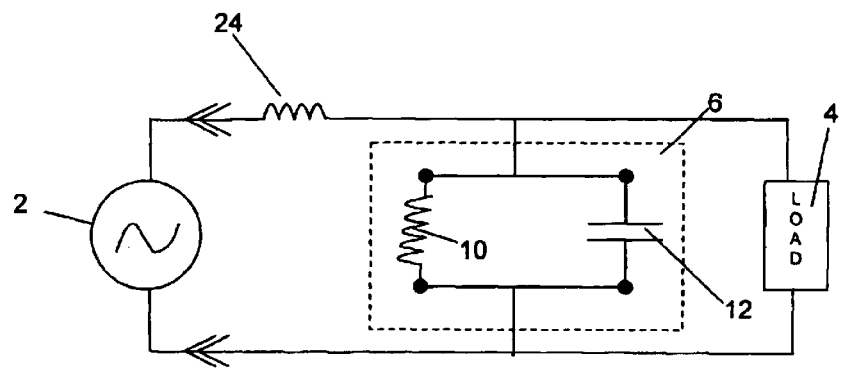
FIG. 2B is a prior art schematic illustration of an exemplary circuit with a series connected inductor coupled to a resonant circuit.

Referring back to FIG. 3A, by not coupling any intervening components between the power source 2 and the parallel resonant circuit 27, the sinusoidal supply of voltage 26 to the load 4 improves compared to the prior art FIG. 2A of the present invention. The current 28 drawn by the load 4 at the voltage peak 26 is no longer distorted, and the peak of the voltage 26 is more pronounced. Given that there are no intervening components, the resonant circuit 27 can now deliver enough power at the peak of voltage 26 (where the load 4 draws most of the current 28) to compensate and restore for any signal distortions. The resonant circuit 27 operating at the fundamental frequency of the power source 2, through inductor 25 supplies current back into the system to restore any possible distortions of the supply voltage wave form 26 during current draw by the load 4. This timing is possible because the resonance of circuit 27 is tuned to resonate at a frequency equal to the fundamental frequency of the power source 2.

As illustrated, the current 28 drawn at the peak of voltage 26 has a narrower horizontal base width with respect to time T, making it vertically more pronounced compared to the prior art FIG. 2A of the present invention. In addition, this narrowing of the current 28 at its base translates into correction of the voltage waveform 26, making the voltage 26 more pronounced at the peak. This supply of correct voltage 26 and current 28 to the load 4 is possible because the circuit 27 now freely supplies these signals without any hindrance or impedance caused by any intervening element, as was the case for the prior art.

Figure 4A:
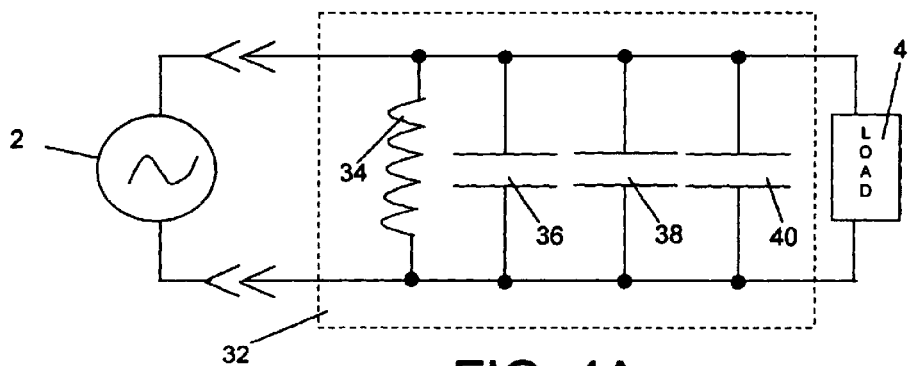
FIG. 4A schematically illustrates an exemplary parallel resonant circuit directly connected to a power source in accordance with a second embodiment the present invention.

FIG. 4A schematically illustrates an exemplary parallel resonant circuit 32 directly connected in parallel to a power source 2 with no intervening elements in accordance with a second embodiment of the present invention. The parallel resonant circuit 32 is comprised of three parallel-connected capacitors 36, 38, and 40 connected in parallel with a single inductor 34. The capacitive values of each capacitor 36, 38, and 40 may be set to be equal or scaled down in size from the highest to the lowest. The reactive impedance of the inductor 34 and the combined reactive impedance of the three capacitors 36, 38, and 40 of parallel resonant circuit 32 are set substantially equal in value, but opposite in sign. Accordingly, the components 34, 36, 38, and 40 are tuned to resonate at a frequency. Although the parallel resonant circuit 32 may be tuned to operate at any resonant frequency value (depending on the size of the components), the preferred embodiment is to tune the circuit 32 to operate at a resonant frequency that matches the operating fundamental frequency of the power source 2 to filter out frequencies above or below the fundamental, providing low noise signals to load 4.

Similar to the exemplary circuit shown in FIG. 3B, for the schematically illustrated circuit shown in FIG. 4A the total impedance of the path to ground for input signals operating far removed from the fundamental includes only that presented by the parallel resonant circuit 32. Therefore, the total impedance of a path to ground for signals with undesirable operating frequency will behave as a shorted path when the parallel resonant circuit 32 behaves ideally and presents a "short circuit" behavior. Accordingly, the impedance of the circuit path to ground for FIG. 4A is also given by:

$$Z_{TOTAL} = Z_{PRC} \qquad (8)$$

Where
$Z_{PRC}$=Impedance of the Parallel Resonant Circuit
$Z_{TOTAL}$=Total impedance.

Figure 4B:
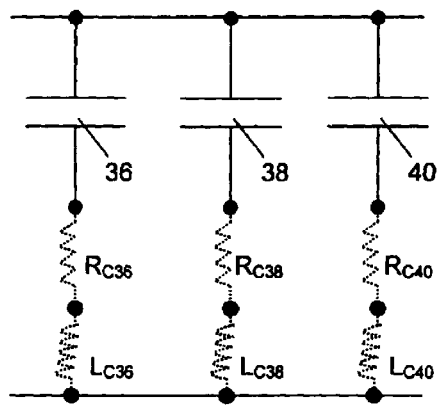
FIG. 4B schematically illustrates the intrinsic or inherent characteristics of parallel-connected capacitors of FIG. 4A in accordance with the present invention.
Figure 4C:
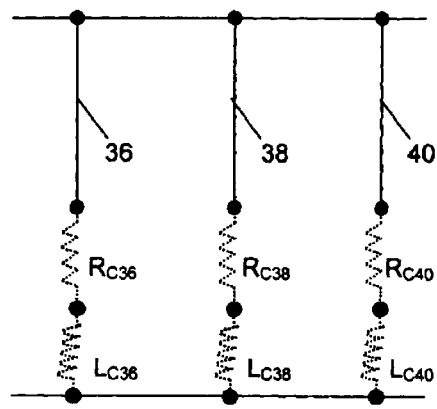
FIG. 4C schematically illustrates the intrinsic or inherent characteristics of parallel connected capacitors of FIG. 4A for frequencies far removed from the resonant frequency in accordance with the present invention.

The parallel method of coupling capacitors further contributes to attenuation of undesired signals with even higher frequency levels because the parallel combination of these capacitors lowers their overall intrinsic or inherent DC resistance $R_{CT}$. FIG. 4B illustrates the non-idealized view of capacitors 36, 38, and 40 with their respective inherent impedance comprised of resistor $R_{C36}$ and inductor $L_{C36}$, resistor $R_{C38}$ and inductor $L_{C38}$, and resistor $R_{C40}$ and inductor $L_{C40}$. As discussed above, at resonance, input signals with frequencies becoming far removed from the resonance frequency of the parallel resonant circuit 32 (which operates at the fundamental of the power source 2) see an ever decreasing impedance presented by the circuit 32. In other words, as illustrated in FIG. 4C, the capacitors 36, 38, and 40 behave like a short circuit with the exception of their intrinsic or inherent impedance. This effectively causes the inherent impedance of these capacitors to form a parallel connection. However, connecting any resistances (or impedance) in parallel reduces the total resistance of a circuit. As an example, simple application of Ohms law using Kirckoff's Voltage or Current Laws (KVL/KCL) on a circuit topography with two parallel connected resistors (impedance) will show that for any two impedance with resistances $R_1$ and $R_2$, their parallel combination will have a total resistance value $R_T$ that is always less than the smallest branch resistance, $R_1$ or $R_2$.

$$R_T = \frac{R_1 \times R_2}{R_1 + R_2} < \text{smaller of } R_1 \text{ or } R_2 \qquad (9)$$

Or in general, $$\frac{1}{R_T} = \frac{1}{R_1} + \frac{1}{R_2} + \frac{1}{R_3} + \frac{1}{R_N} \qquad (10)$$

Therefore, the three combined parallel capacitors will have lower intrinsic or inherent impedance than a single capacitor, contributing to lower total inherent impedance $Z_{TOTAL}$. Application of this concept to the circuit topography of FIG. 4C will therefore result in attenuation of even higher frequencies that are further removed from the fundamental due to these lower inherent impedance values.

Figure 4D:
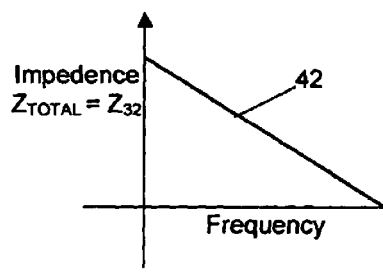
FIG. 4D is an exemplary graphical illustration of impedance vs. frequency for the circuit of FIG. 4A in accordance with the present invention.

FIG. 4D graphically illustrates the impedance versus frequency for the circuit topography schematically illustrated in FIG. 4A, with no intervening components between the parallel resonant circuit 32 and the power source 2. As shown, as the frequency increases (moves away from the resonant frequency), the total impedance $Z_{TOTAL}$ (for the path to ground for these signals) illustrated by line 42 decreases to thereby allow a short path to ground for current signals with undesirable frequencies, filtering out these signals. For larger frequencies of interest, the $Z_{TOTAL}$ will equal zero. The main reason for the difference between this graph and the existence of region 31 illustrated in the graph of FIG. 3C is the intrinsic or inherent impedance values of the parallel resonant circuit. The parallel combination of the capacitors 36, 38, and 40 reduced their inherent or intrinsic impedance values. Hence, even for frequencies much higher than those desired, the impedance presented will be negligible, and parallel resonant circuit 32 will have zero impedance for most purposes such that $Z_{TOTAL}=0$. $Z_{TOTAL}$ will therefore present a short circuit path for signals with frequencies far removed from the desired operating frequency.

Figure 5:
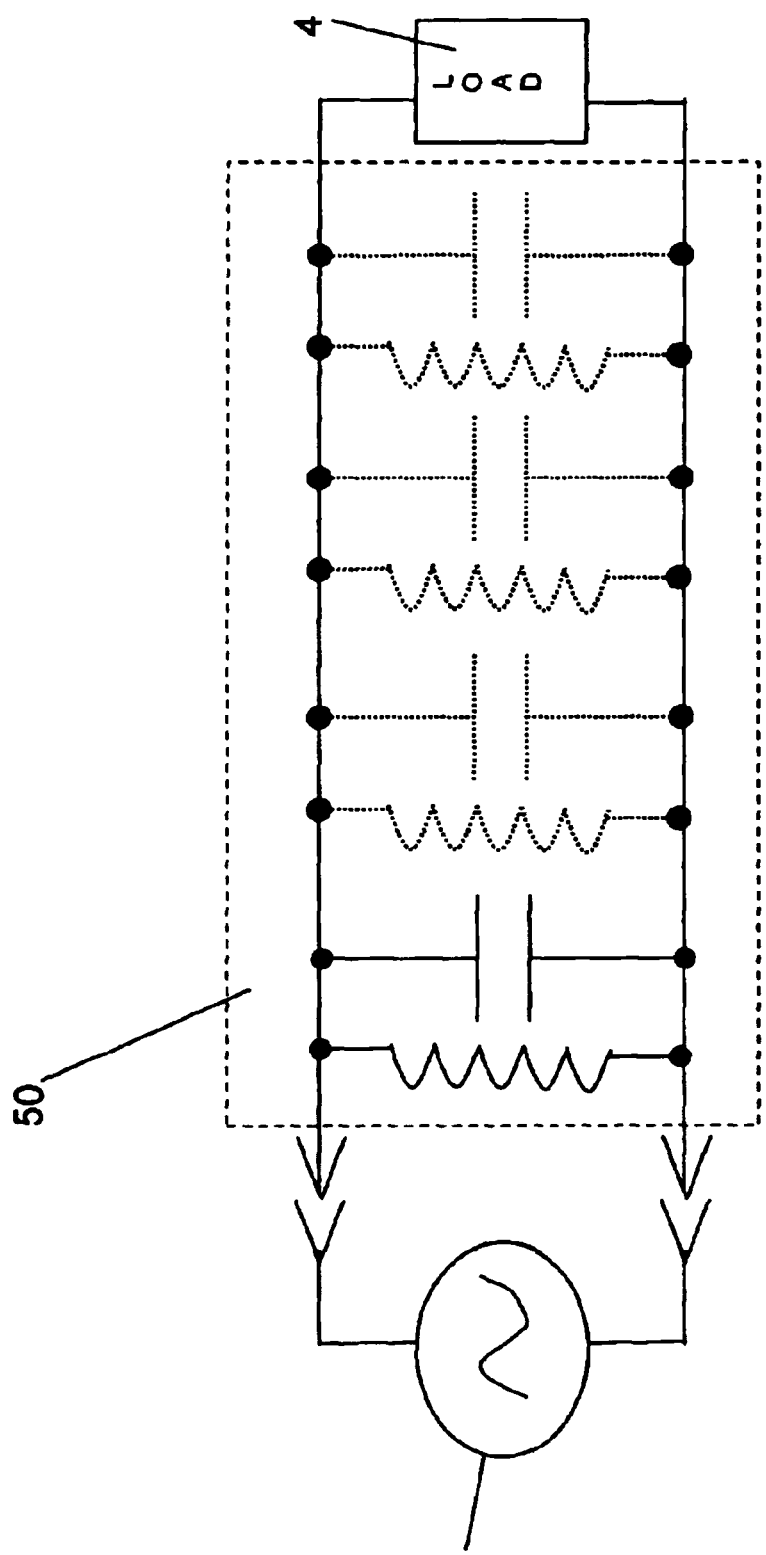
FIG. 5 schematically illustrates an exemplary parallel resonant circuit directly connected to a power source in accordance with a third embodiment of the present invention.

FIG. 5 is a third embodiment of the power system schematically illustrating an exemplary parallel resonant circuit 50 directly connected to a power source 2 in accordance with the present invention. The purpose of this circuit is to show that any number of capacitors and inductors may be coupled in parallel to form a resonant circuit. The combined reactive impedance of the inductors and the combined reactive impedance of the capacitors of parallel resonant circuit 50 are set substantially equal in value, but opposite in sign. Accordingly, the components are tuned to resonate at a frequency. Although the parallel resonant circuit 50 may be tuned to operate at any resonant frequency value (depending on the size of the components), the preferred embodiment is to tune the circuit 50 to operate at a resonant frequency that matches the operating fundamental frequency of the power source 2 to filter out frequencies above or below the fundamental, providing low noise signals to load 4.

Figure 6:
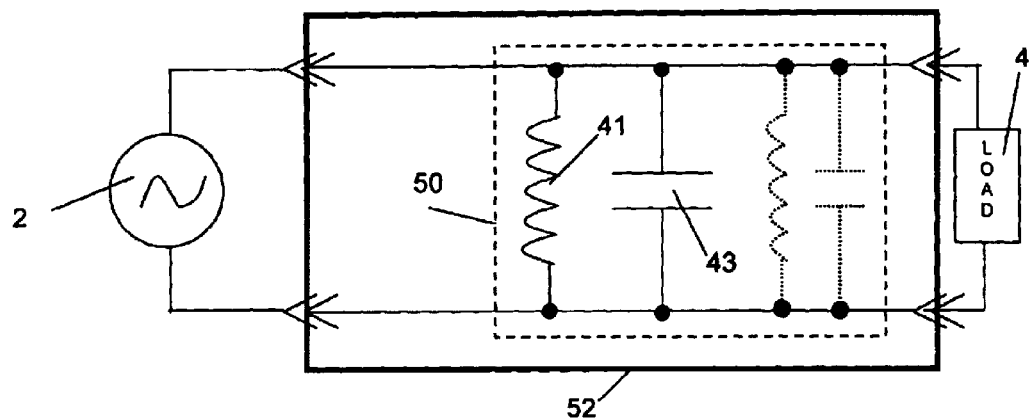
FIG. 6 schematically illustrates an exemplary parallel resonant circuit and its connection within a power system as a stand-alone device in a filter box form factor configuration in accordance with the present invention.
Figure 7:
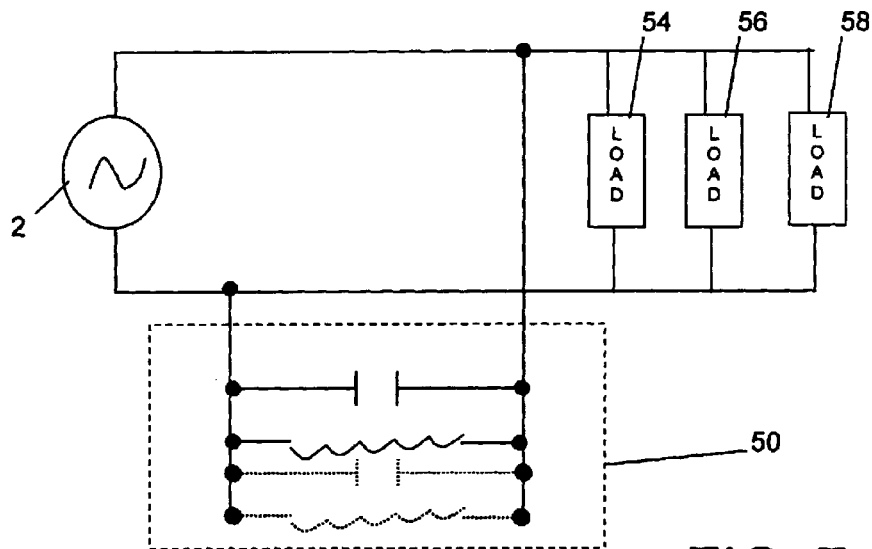
FIG. 7 schematically illustrates an exemplary parallel resonant circuit connected directly to a power source some where along the circuit power line in accordance with the present invention.

FIG. 6 illustrates the parallel resonant circuit 50 and its connection within a power system as a stand-alone device in accordance with the present invention. As illustrated, the parallel resonant circuit 50 may be placed in a filter box 52, directly coupled in parallel to a power source 2 and a load 4. FIG. 7 illustrates a schematic drawing of the parallel resonant circuit 50 connected directly to a power source 2 some where along the circuit power line. Elements 54, 56, and 58 are loads that connect to the same power line.

The physical distance between the parallel resonant circuit 50 (within a box as stand-alone or otherwise) and the load 4 or the power source 2 affects the overall performance of the parallel resonant circuit. Accordingly, depending on how far away the parallel resonant circuit 50 is from the load 4 or the power source 2, the level of frequencies that circuit 50 is able to attenuate diminish as this distance increases. One reason for this is because the longer the cable or power line connecting the parallel resonant circuit 50 with the load 4 or the power source 2, the higher the cable or power line intrinsic or inherent inductive impedance. The cable or the power line present an inductive characteristic, and behave similar to prior art inductors that were actually coupled to power lines or cables in series with the power source or the loads. Therefore, depending on the level of frequency desired to be filtered, the physical length of the cable or power line connecting the resonant circuit 50 with the power source 2 or the loads should be taken into consideration and adjusted accordingly.

Figure 8:
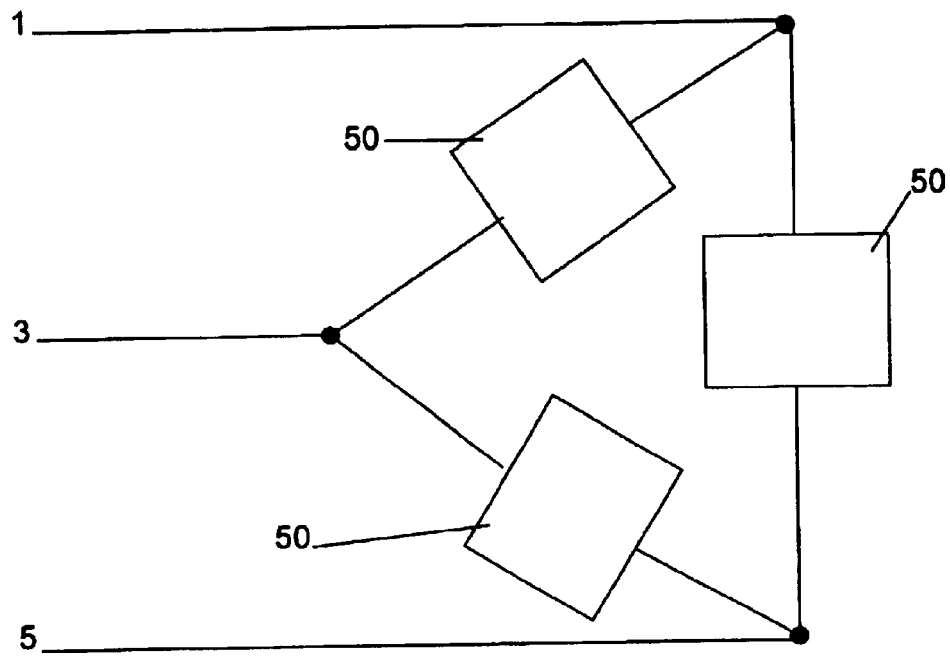
FIG. 8 schematically illustrates exemplary parallel resonant circuits connected in a three-phase delta configuration power system in accordance with the present invention.

FIG. 8 is schematic illustration of the parallel resonant circuits 50 connected in a three-phase delta configuration power system in accordance with the present invention. Three identical parallel resonant circuits 50, each comprising one or more inductors and one or more capacitors connected in parallel are constructed. The parallel resonant circuits 50 are connected between conductor 1, 3, and 5, and in parallel with the source with no intervening components.

Figure 9:
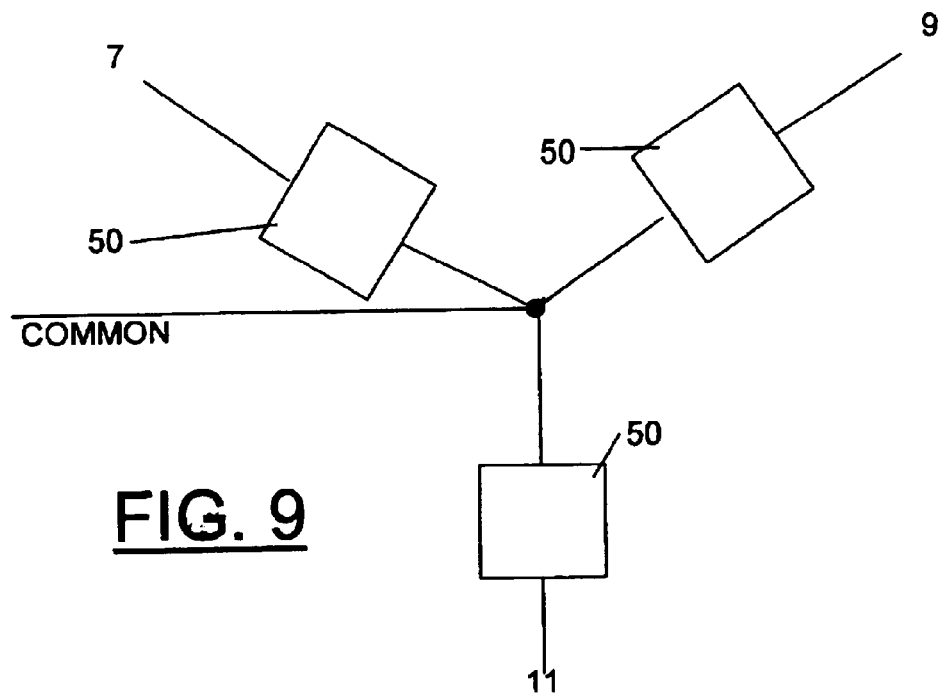
FIG. 9 schematically illustrates exemplary parallel resonant circuits connected in a three-phase wye configuration power system in accordance with the present invention.

FIG. 9 is schematic illustration of parallel resonant circuits 50 connected in a three-phase wye configuration power system in accordance with the present invention. Three identical parallel resonant circuits 50, each comprising one or more inductors and one or more capacitors connected in parallel are constructed. The parallel resonant circuits 50 are connected within power line conductors 7, 9, and 11, and in parallel with the power source with no intervening components.

While illustrative embodiments of the invention have been described, numerous variations and alternative embodiments will occur to those skilled in the art. For example, the overall power system and the sensitivity of the load to frequency and signal distortion will dictate the number, type, and size of the capacitors and inductors used for design and engineering of a parallel resonant circuit. Such variations and alternate embodiments are contemplated, and can be made without departing from the spirit and the scope of the invention.

What is claimed is:

1. A circuit for correcting perturbations in a power system signal operating at a system line frequency said circuit comprising:

at least one capacitive element for drawing a capacitive current;

at least one inductive element for drawing an inductive current substantially equal in amplitude and substantially one hundred eighty degrees out of phase with said capacitive current;

said at least one inductive element connected in parallel with said at least one capacitive element to form a parallel resonant circuit;

said parallel resonant circuit is tuned to resonate at said system line frequency and is connected in parallel directly across a power source with no intervening electrical components between said power source and said parallel resonant circuit;

said parallel resonant circuit has circulating currents of substantially the same amplitude as a load current, wherein said parallel resonant circuit absorbs voltage perturbations in excess of the amplitude of said power system signal at all frequencies above and below said system line frequency and wherein said parallel resonant circuit provides energy to restore notches in the amplitude of said power system signal at all frequencies above and below said system line frequency.

2. A circuit as claimed in claim 1, where said parallel resonant circuit is a stand-alone device.

3. A circuit as claimed in claim 1, where said parallel resonant circuit is part of a power inlet system.

4. A circuit as claimed in claim 1, where said power system is a single phase unit.

5. A circuit as claimed in claim 1, where said power system is a three-phase unit.

6. A filtering circuit, comprising:

a plurality of capacitive elements coupled in parallel;

at least one inductor connected in parallel to said plurality of capacitive elements to form a filter circuit;

a reactive impedance of said at least one inductor and a combined reactive impedance of said plurality of capacitive elements set substantially equal in value and one hundred and eighty degrees out of phase and tuned to resonate at a frequency value equal to a fundamental frequency value of a parallel connected power source with no intervening components connected between said power source and said filtering circuit.

7. A circuit as claimed in claim 6, where said filtering circuit is a stand-alone device.

8. A circuit as claimed in claim 6, where said filtering circuit is part of a power inlet system.

9. A circuit as claimed in claim 6, where said power system is a single phase unit.

10. A circuit as claimed in claim 6, where said power system is a three-phase unit.

11. A circuit as claimed in claim 1, wherein said parallel resonant circuit is directly coupled with a load with no intervening component.

12. A circuit as claimed in claim 6, wherein said parallel resonant circuit is directly coupled with a load with no intervening component.

* * * * *